US010599424B2

(12) United States Patent
Masis et al.

(10) Patent No.: US 10,599,424 B2
(45) Date of Patent: Mar. 24, 2020

(54) COMMITTED PROGRAM-CODE MANAGEMENT

(71) Applicant: Red Hat Israel, Ltd., Raanana (IL)

(72) Inventors: Alexander Braverman Masis, Haifa (IL); Ilia Meerovich, Haifa (IL)

(73) Assignee: Red Hat Israel, Ltd., Raanana (IL)

( * ) Notice: Subject to any disclaimer, the term of this patent is extended or adjusted under 35 U.S.C. 154(b) by 156 days.

(21) Appl. No.: 15/183,209

(22) Filed: Jun. 15, 2016

(65) Prior Publication Data
US 2017/0364354 A1 Dec. 21, 2017

(51) Int. Cl.
*G06F 9/44* (2018.01)
*G06F 8/71* (2018.01)

(52) U.S. Cl.
CPC ..................... *G06F 8/71* (2013.01)

(58) Field of Classification Search
CPC .. G06F 7/78; G06F 8/00–78; G06F 9/44–455; G06F 11/36; G06F 8/71
USPC ......................................................... 717/101
See application file for complete search history.

(56) References Cited

U.S. PATENT DOCUMENTS

| 6,178,429 | B1 | 1/2001 | Cherf |
| 8,037,453 | B1 | 10/2011 | Zawadzki |
| 8,464,222 | B2 * | 6/2013 | Bell ...................... G06F 11/263 717/126 |
| 8,522,207 | B1 | 8/2013 | Whittington et al. |
| 8,745,585 | B2 | 6/2014 | Walters et al. |
| 9,430,229 | B1 * | 8/2016 | Van Zijst .............. G06F 9/3844 |
| 2006/0136904 | A1 * | 6/2006 | Weidman .................. G06F 8/71 717/172 |
| 2011/0283268 | A1 * | 11/2011 | Salter ...................... G06F 8/433 717/140 |
| 2012/0151118 | A1 * | 6/2012 | Flynn .................. G06F 11/1008 711/6 |
| 2012/0297359 | A1 * | 11/2012 | Chen ......................... G06F 8/71 717/104 |

(Continued)

FOREIGN PATENT DOCUMENTS

| WO | WO-2015084319 A1 * | 6/2015 | .......... G06F 11/3668 |
| WO | WO 2015/112170 A1 | 7/2015 | |

OTHER PUBLICATIONS

"Automatically triggering a Jenkins build on Git commit," 2015, http://www.andvfrench.info/2015/03/automatically-triggering-jenkins-build.html.

(Continued)

*Primary Examiner* — Anna C Deng
(74) *Attorney, Agent, or Firm* — Kilpatrick Townsend & Stockton LLP

(57) ABSTRACT

An association between two or more segments of committed program code can be determined so that the segments of committed program code can be used together for building a software project. For example, one or more communications can be received and indicate that two or more segments of program code are to be committed to one or more repositories associated with a software project. Thereafter, the segments of program code, a database, or other information can be analyzed to determine an association between the two or more segments of program code. Based on the association between the two or more segments of program code, the two or more segments of program code can be integrated together into combined program code. A build tool can then build the software project using the combined program code.

17 Claims, 2 Drawing Sheets

(56) References Cited

U.S. PATENT DOCUMENTS

| | | | |
|---|---|---|---|
| 2014/0289280 A1 | 9/2014 | Zichterman et al. | |
| 2015/0025925 A1 | 1/2015 | Moore et al. | |
| 2015/0106790 A1* | 4/2015 | Bigwood ............ | G06F 11/3624 717/127 |
| 2015/0286558 A1* | 10/2015 | Bartlow .................... | G06F 8/71 717/131 |
| 2015/0331689 A1* | 11/2015 | Blahaerath ................ | G06F 8/71 717/106 |
| 2016/0028672 A1* | 1/2016 | Kaul ....................... | H04L 51/10 709/206 |
| 2016/0092526 A1* | 3/2016 | Kothari ............ | G06F 17/30563 707/602 |
| 2016/0188325 A1* | 6/2016 | Blitzstein .............. | H04L 65/403 717/101 |
| 2018/0034270 A1 | 2/2018 | Swiere et al. | |

OTHER PUBLICATIONS

"Commit (version control)," 2016, http://en.wikipedia.org/wiki/Commit_(version control).

"How do I get all git comments using Jenkins multiple scm plugin with git," http://stackoverflow.com/questions/20102052/how-do-i-get-all-git-commits-using-jenkins-multiple-scm-plugin-with-git?rg=1.

Karzynski, Michal, "Setting up Jenkins as a continuous integration server for Django," 2014, http://michal.karzynski.pl/blog/2014/04/19/continuous-inteoration-server-for-django-using-jenkins/.

"Squash several Git commits into a single commit," http://makandracards.com/makandra/527-squash-several-git-commits-into-a-single-commit.

* cited by examiner

COMMITTED PROGRAM-CODE MANAGEMENT

TECHNICAL FIELD

The present disclosure relates generally to software development. More specifically, but not by way of limitation, this disclosure relates to managing associations between segments of program code for building a software project.

BACKGROUND

Software development can involve several developers simultaneously working on program code to create a single piece of software. But if multiple developers simultaneously modify the same program code for the piece of software, changes by some of the developers may be erased or overwritten. To prevent this and other issues, developers can receive a copy of the program code from a central repository and store the copy of the program code in another location, such as on a local computer. The central repository can store a master copy (e.g., a fully updated or tested copy) of the program code. The developers can then each make updates to the respective copies of the program code without affecting the work performed by the other developers.

DETAILED DESCRIPTION

Figure 1:
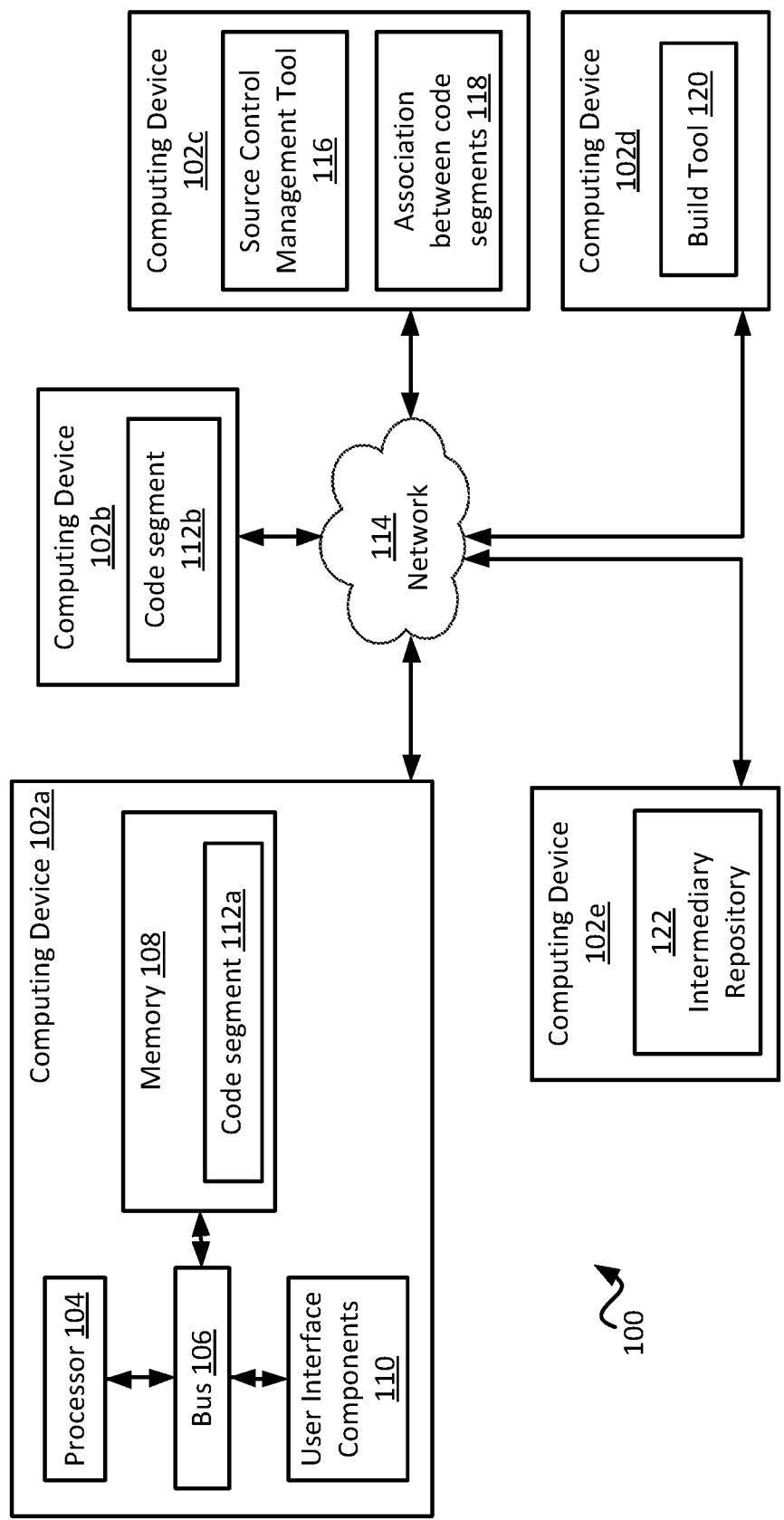
FIG. 1 is a block diagram of a system for managing associations between segments of program code according to some aspects.

Certain aspects and features of the present disclosure relate to managing multiple segments of updated program code in a software development environment so that the segments of updated program code can be used together for building a software project. Building a software project can include converting the software project into a stand-alone format that can be run on a computing device. Managing the segments of update program code can include determining an association between the segments of updated program code so that the segments of updated program code can be integrated together for building the software project. Some examples can allow for related, dependent, or otherwise associated segments of updated program code to be identified and correlated for proper handling and integration by a build tool, so that the build tool can correctly build the software project.

As a particular example, multiple developers can work together to develop a software application, such as an operating system for a computing device. The developers can each receive a copy of the program code for the software from a central repository. The developers can modify the respective copies of the program code to fix bugs, add in new features, or remove existing features, and then perform commits to save the respective changes back to the central repository. But before each segment of committed program code is saved to the central repository, the segment of committed program code may be individually tested to ensure that it is of good quality. For example, a build tool can check a segment of committed program code for syntax or other programming errors and attempt to build the segment of committed program code into an executable file to ensure that the committed program code can be built correctly.

But sequentially testing segments of committed program code may lead to build errors and other errors if the segments of committed program code rely on one another. For example, if two segments of committed program code depend on one another, both segments of committed program code may fail the individual tests performed by the build tool because the build tool may be unaware that the segments of committed program code depend on one another for proper execution. Some examples of the present disclosure can overcome these and other issues by determining one or more associations between segments of committed program code and using the associations between the segments of committed program code to properly build the software application.

For example, a computing device can analyze the segments of committed program code, metadata associated with the segments of committed program code, data in a database, or any combination of these to determine if there is a relationship between the segments of committed program code. The computing device can then provide information about one or more relationships between the segments of committed program code to the build tool, or otherwise integrate the segments of the committed program code for use by the build tool. This can allow for the build tool to properly compile and execute the segments of committed program code to build the software application.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of a system 100 for managing associations between segments of program code according to some aspects. The system 100 can include any number and combination of computing devices 102a-e. The computing devices 102a-e can be in direct communication with one another or in communication with one another via a network 114, such as a local network or the Internet.

In some examples, the system 100 can include a computing device 102a associated with a developer of a software project. The computing device 102a can include a segment of program code 112a to be committed to a repository of the software project. The segment of program code 112a can be for fixing a bug in the software project, a new feature to be integrated into the software project, or for implementing some other change. The computing device 102a can transmit a command (e.g., a commit command) to the computing device 102c for committing the segment of program code 112a.

The system 100 can include a computing device 102b associated with a different developer of the software project. The computing device 102b can include a different segment of program code 112b to be committed to the same or a different repository of the software project as the segment of program code 112a. The computing device 102b can transmit a command to the computing device 102c for committing the segment of program code 112b.

The computing device 102c can execute a source control management (SCM) tool 116. The SCM tool 116 can include a version control system (e.g., Git), for managing versions of program code for a software project, a collaboration system (e.g., Gerrit) for allowing multiple developers to collaborate on a software project, or other tools for aiding in software development. The computing device 102c can receive the commands from the computing devices 102a-b and determine an association 118 between the segments of program code 112a-b. For example, the SCM tool 116 can receive the commands from the computing devices 102a-b and determine the association 118 between the segments of program code 112a-b. Examples of how the association 118 can be determined are discussed in greater detail with respect to FIG. 2. In some examples, the computing device 102c can transmit the association 118 between the segments of program code 112a-b to the computing device 102d for use in building the software project. In other examples, the computing device 102c can store a file that indicates the association 118 between the segments of program code 112a-b, a combination of of the segments of program code 112a-b, or both of these in an intermediary repository 122. The computing device 102d can use the file, the combination of the segments of program code 112a-b, or both of these for building the software project.

The computing device 102d can execute a build tool 120, such as Jenkins. The build tool 120 can compile and execute the segments of program code 112a-b to build the software project. In examples in which the computing device 102d receives the association 118 from the computing device 102c, the computing device 102d can use the association 118 to build the software project. In examples in which a file, a combination of the segments of program code 112a-b, or both of these are stored in the intermediary repository 122, the computing device 102d can analyze, extract, or otherwise the use the file and the segments of program code 112a-b for building the software application.

In some examples, the build tool 120 can include a continuous integration (CI) tool. A CI tool can frequently and automatically save and test updated copies of program code from one or more developers. Typically, this can help prevent program-code integration errors and loss of work. But, in a traditional system, if segments of program code 112a-b are associated with one another, the CI tool may repeatedly output errors when sequentially testing the segments of program code 112a-b because the CI tool is unaware of the association. This can be distracting and irritating for the developers, and can inaccurately represent the quality of the segments of program code 112a-b. But some examples of the present disclosure can overcome these issues by providing the build tool 120 with information about the association 118 between the segments of program code 112a-b. Further, some examples of the present disclosure overcome these and other issues by integrating the segments of program code 112a-b together and storing them in the intermediary repository 122. The build tool 120 can then use the integrated segments of program code 112a-b stored in the intermediary repository 122 to build the software application.

In some examples, the computing device 102d can transmit a communication to the computing devices 102a-b indicating that a status of the build (e.g., that the build is in progress, succeeded, or failed). Additionally or alternatively, the computing device 102d can cause another computing device, such as computing device 102c, to transmit a communication to computing devices 102a-b indicating the status of the build.

In some examples, the computing devices 102a-e can each include a processor, a bus, a memory, user interface components, and other components. But for simplicity, these components have only been depicted within computing device 102a. In some examples, the components can be integrated into a single structure. For example, the components can be within a single housing. In other examples, the components can be distributed (e.g., in separate housings) and in electrical communication with each other.

The processor 104 of the computing device 102a can execute one or more operations for implementing any of the features of the present disclosure. The processor 104 can execute instructions stored in the memory 108 to perform the operations. The processor 104 can include one processing device or multiple processing devices. Non-limiting examples of the processor 104 include a Field-Programmable Gate Array ("FPGA"), an application-specific integrated circuit ("ASIC"), a microprocessor, etc.

The processor 104 can be communicatively coupled to the user interface components 110 via the bus 106. The user interface components 110 can include, or facilitate connection to, one or more user interface devices. Examples of a user interface device can include a display device, touch-sensitive surface, touch-screen display, keyboard, mouse, speaker, microphone, button, or other hardware used to input data or output data. For example, the user interface components 110 can include a keyboard and a mouse for receive user input and a display device for providing output.

The processor 104 can be communicatively coupled to the memory 108 via the bus 106. The non-volatile memory 108 may include any type of memory device that retains stored information when powered off. Non-limiting examples of the memory 108 include electrically erasable and programmable read-only memory ("EEPROM"), flash memory, or any other type of non-volatile memory. In some examples, at least some of the memory 108 can include a medium from which the processor 104 can read instructions. A computer-readable medium can include electronic, optical, magnetic, or other storage devices capable of providing the processor 104 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

The memory 108 can include the segment of program code 112a. The memory 108 additionally or alternatively can include any number and combination of applications, engines, modules, or other program code for enabling one or more features of the present disclosure.

Although FIG. 1 shows one configuration of features (e.g., computing devices 102a-e, segments of program code 112a-b, the SCM tool 116, the build tool 120, the intermediary repository 122, etc.), other examples may have more, fewer, or different arrangements of features. More particularly, one example can include a single computing device 102c having the SCM tool 116 and the build tool 120, so that computing device 102d may be unnecessary. Another example can include both segments of program code 112a-b within a single computing device 102a, so that computing device 102b may be unnecessary. Yet another example can include a single computing device 102a having the segments of program code 112a-b, the SCM tool 116, the build tool 120, and the intermediary repository 122, so that computing devices 102b-e may be unnecessary. As yet another example, the SCM tool 116 and the build tool 120 can be combined into a single, integrated software component, rather than being separate software components. Any arrangement and combination of the features shown in FIG.

1 is possible, and the particular arrangement of features shown in FIG. 1 is not intended to be limiting or exhaustive.

Figure 2:
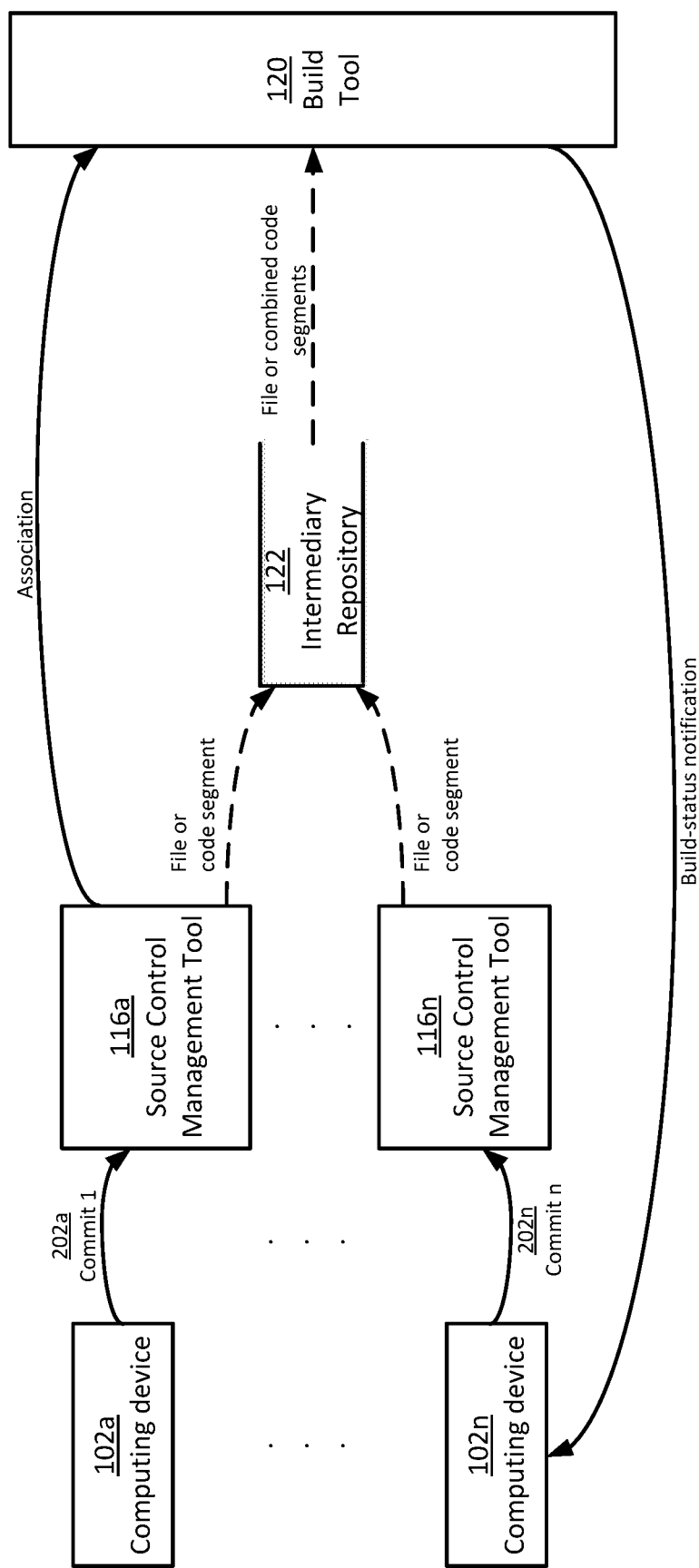
FIG. 2 is a data flow diagram of an example of using an association between segments of program code for building a software project according to some aspects.

FIG. 2 is a data flow diagram of an example of using an association between segments of program code for building a software project according to some aspects. As shown in FIG. 2, multiple commits 202a-n can be received from multiple developers (e.g., interacting with multiple computing devices 102a-n) of a software project. For example, commit 202a can be received from at SCM tool 116a. The commit 202a can be for saving a segment of program code to a repository associated with the software project. Another commit 202n from another developer can be received at another SCM tool 116n. The other commit 202n can be for saving another segment of program code to another repository associated with the software project. Any number and combination of commits 202a-n can be received from any number and combination of developers, at any number and combination of system components (e.g., SCM tools 116a-n), for committing any number and combination of segments of program code to any number and combination of repositories associated with the software project.

In some examples, each commit 202a-n can include a command for causing a corresponding segment of program code to be saved to one or more repositories associated with the software project. For example, the commit 202a can include the command "commit -m <message>." The command can cause a predetermined segment of program code to be committed to a predetermined repository associated with the software project. The "<message>" portion of the command can include information supplied by the user about the commit, such as a version of the segment of program code to be committed, a title or name for the commit, etc.

In some examples, a commit 202a can include information usable for associating the commit 202a with at least one related commit 202n. For example, a portion of a commit command (e.g., the "<message>" portion of the above command) can include an identifier of a related commit. Examples of the identifier can include a uniform resource locator (URL) for a website associated with the related commit, a name of the related commit; a name, or internet protocol (IP) address, or other identifier of a SCM tool 116n associated with the related commit 202n; an identification number of the related commit 202n; or any combination of these. Additionally or alternatively, the commit 202a can include or otherwise be associated with metadata or a file that includes information usable for associating the commit 202a with the related commit 202n. For example, the commit 202a can include metadata that includes a name, identification number, or other identifier of a related commit 202n. As another example, a file that includes the segment of program code to be saved via the commit 202a can have metadata or other information for associating the commit 202a with the related commit 202n.

An association (e.g., a dependency) between the commits 202a-n can be determined. For example, the SCM tool 116a can determine an association between the commits 202a-n. As another example, the SCM tools 116a-n can communicate with one another to determine an association between the commits 202a-n. Any number and combination of SCM tools 116a-n or other system components can be used to determine the association between the commits 202a-n.

The association between the commits 202a-n can be determined by analyzing a commit 202a; metadata, a tag, or a file associated with a commit 202a; a segment of program code corresponding to a commit 102a; information in a database; or any combination of these. For example, a "<message>" portion of a command from commit 202a can be analyzed to determine a related commit 202n. As another example, a "related commits" section in metadata or a file associated with the commit 202a can be analyzed to determine the related commit 202n. As another example, a database that includes relationships between commits 202a-n can be used to map commit 202a to the related commit 202n.

Additionally or alternatively, an association between the segments of program code corresponding to the commits 202a-n can be determined (e.g., using any of the above-described techniques). The association between the segments of program code can include a dependency between the segments of program code. In some examples, a database, metadata, a file, a tag, an association between commits 202a-n, or any combination of these can be used to determine the association between the segments of program code corresponding to the commits 202a-n. For example, an association between the commits 202a-n can be determined. Then, an association between the segments of program code corresponding to the commits 202a-n can be determined to be the same as the association between the commits 202a-n. Alternatively, an association between the segments of program code corresponding to the commits 202a-n can be determined, and then an association between the commits 202a-n can be determined to be the same as the association between the segments of program code corresponding to the commits 202a-n.

In some examples, the association between the commits 202a-n (or the association between the segments of program code corresponding to the at least two commits 202a-n) can be transmitted to the build tool 120. For example, SCM tool 116a, SCM tool 116n, or both can transmit the association to the build tool 120. The build tool 120 can receive the association and use the association to build the software project. For example, the build tool 120 can integrate the segments of program code corresponding to the commits 202a-n based on the association. In an example in which the commit 202n depends on commit 202a, the build tool 120 can integrate the segment of program code corresponding to commit 202a into the segment of program code corresponding to commit 202n prior to attempting to build commit 202n (e.g., prior to attempting to build the segment of program code corresponding commit 202n). This can help ensure that dependent segments of program code are built together, preventing or reducing build errors.

Additionally or alternatively, the segments of program code corresponding to the at least two commits 202a-n can be integrated, combined, or otherwise included in an intermediary repository 122. For example, SCM tool 116a and SCM tool 116n can upload, include, or integrate the segments of program code corresponding to commit 202a and commit 202n, respectively, into the intermediary repository 122, so that the intermediary repository 122 includes the combined program code. In some examples, the build tool 120 can extract the combined program code stored in the intermediary repository 122 and use the combined program code to build the software application. This can lead to reduced errors, because dependent or otherwise associated segments of program code are built together by the build tool 120.

Additionally or alternatively, a file or other data can be included in the intermediary repository 122. The file or other data can indicate the association between the two or more commits 202a-n (or the association between the segments of program code associated with the two or more commits 202a-n). For example, a text file can be included in the intermediary repository 122. The text file can include URLs to the segments of program code corresponding to commit 202a and commit 202n, respectively. The build tool 120 can extract the URLs from the text file, download or otherwise obtain the program code corresponding to commit 202a and commit 202n using the URLs, combine the program code corresponding to commit 202a and commit 202n into integrated program code, and then build the software application using the integrated program code.

In some examples, the build tool 120 can automatically build the software application based on a change in the content of the intermediary repository 122. For example, including new or modified program code or files in the intermediary repository 122 can automatically trigger the build tool 120 to build the software application using the new or modified program code or files.

In some examples, the build tool 120 can transmit a notification indicating a build status. For example, the build tool 120 transmit a notification to computing device 102n indicating that the software application was successfully built or unsuccessfully built.

In one specific example, the SCM tool 116a can receive commit 202a, which can be for saving a segment of program code for a new software feature to a repository. The SCM tool 116a can also receive commit 202n, which can be for saving a segment of program code for a new software library to a different repository. The new software feature of commit 202a can depend on the new software library of commit 202n. In response to receiving the commits 202a, 202n, the SCM tools 116a, 116n can communicate with one another to determine a relationship between the commits 202a, 202n. For example, SCM tool 116a can transmit information associated with commit 202a, such as a commit identification number, to SCM tool 116n. The SCM tool 116n can use the information to map commit 202a to commit 202n using a database. The mapping between commit 202a and commit 202n can indicate that commit 202a depends on commit 202n. The SCM tool 116n can transmit a communication to the build tool 120, which can be executing on yet another computing device, indicating the dependency of commit 202a on commit 202n. The build tool 120 can receive the communication and, based on the communication, properly integrate the segments of program code corresponding to commit 202a and commit 202n. The build tool 120 can then successfully build the software application using the integrated segments of program code. Thereafter, the build tool 120 can cause notifications indicating that the build succeed to be transmitted to the respective developers associated with the commit 202a and commit 202n.

Any of the functions discussed above with reference to one component can be performed by any other component or combination of components. For example, the build tool 120 may determine the association between the at least two commits 202a-n (or the association between the segments of program code corresponding to the at least two commits 202a-n). Thus, the functions discussed above are not limited to the respective components with which they were discussed. Also, in some examples certain components may not be included. For example, the intermediary repository 122 may not be included. Further, the features discussed above are not limited to the software-development environment depicted in FIG. 2, but rather can be implemented on any suitable software-development environment to link together or otherwise associate updated or modified segments of program code for reducing build errors. For example, some features can be implemented with Eclipse™, Microsoft Visual Studio™, OpenShift™, Apache Subversion™, etc.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A non-transitory computer-readable medium in which instructions executable by a processing device are stored for causing the processing device to:
   receive a first communication via a source control management tool, the first communication indicating that a first commit is to be performed for causing first source code for a project to be merged into a repository associated with the project;
   receive a second communication via the source control management tool, the second communication indicating that a second commit is to be performed for causing second source code for the project to be merged into the repository associated with the project;
   determine a dependency between the first source code and the second source code in response to receiving the first communication and the second communication;
   in response to determining the dependency between the first source code and the second source code, store the first source code and the second source code in an intermediary repository that is separate from the repository associated with the project;
   wherein a build tool is configured to:
      monitor the intermediary repository for changes in content;
      detect a change in the content of the intermediary repository based on the first source code or the second source code being stored in the intermediary repository;
      based on detecting the change in the content of the intermediary repository, obtain the first source code and the second source code from the intermediary repository and integrate the first source code and the second source code together into combined program code; and
      subsequent to integrating the first source code and the second source code into the combined program code, test the combined program code for defects in the first source code or the second source code at least in part by attempting to build the combined program code.

2. The non-transitory computer-readable medium of claim 1, further comprising instructions for causing the processing device to receive the first communication from a first remote computing device and the second communication from a second remote computing device.

3. The non-transitory computer-readable medium of claim 1, further comprising instructions for causing the processing device to, subsequent to determining the dependency between the first source code and the second source code, store a file in the intermediary repository indicating the dependency between the first source code and the second source code, the file being configured for use by the build tool.

4. The non-transitory computer-readable medium of claim 1,
   wherein the intermediary repository is specifically designated for storing source code to be tested by the build tool.

5. The non-transitory computer-readable medium of claim 1, further comprising instructions for causing the processing device to determine the dependency by mapping first information about the first commit to second information about the second commit in a database.

6. The non-transitory computer-readable medium of claim 1, further comprising instructions for causing the processing device to determine the dependency based on first information about the first commit, wherein the first information about the first commit includes metadata or a tag indicative of the dependency.

7. The non-transitory computer-readable medium of claim 1, wherein the first communication and the second communication are subparts of a single communication.

8. The non-transitory computer-readable medium of claim 1, wherein the source control management tool includes a first source control management tool and a second source control management tool that is separate from the first source control management tool, and wherein the first communication is received via the first source control management tool and the second communication is received via the second source control management tool.

9. The non-transitory computer-readable medium of claim 8, wherein the first source control management tool is a first instance of a particular source control management tool and the second source control management tool is a second instance of the particular source control management tool.

10. The non-transitory computer-readable medium of claim 8, further comprising instructions for causing the processing device to:
determine first information about the first commit using the first source control management tool and determine second information about the second commit using the second source control management tool; and
determine the dependency based on the first information and the second information.

11. A method comprising:
receiving, by a processing device, a first communication via a source control management tool, the first communication indicating that a first commit is to be performed for causing first source code for a project to be merged into a repository associated with the project;
receiving, by the processing device, a second communication via the source control management tool, the second communication indicating that a second commit is to be performed for causing second source code for the project to be merged into the repository associated with the project;
determining, by the processing device, a dependency between the first source code and the second source code in response to receiving the first communication and the second communication; and
in response to determining the dependency between the first source code and the second source code, store the first source code and the second source code in an intermediary repository that is separate from the repository associated with the project;
wherein a build tool is configured to:
monitor the intermediary repository for changes in content;
detect a change in the content of the intermediary repository based on the first source code or the second source code being stored in the intermediary repository;
based on detecting the change in the content of the intermediary repository, obtain the first source code and the second source code from the intermediary repository and integrate the first source code and the second source code together into combined program code; and
subsequent to integrating the first source code and the second source code into the combined program code, test the combined program code for defects in the first source code or the second source code at least in part by attempting to build the combined program code.

12. The method of claim 11, further comprising receiving the first communication from a first remote computing device and the second communication from a second remote computing device.

13. The method of claim 11,
further comprising, subsequent to determining the dependency between the first source code and the second source code:
generating dependency information indicating the dependency between the first source code and the second source code; and
storing a file comprising the dependency information in the intermediary repository, the file being configured for use by the build tool.

14. The method of claim 11, further comprising determining the dependency by mapping first information about the first commit to second information about the second commit in a database.

15. The method of claim 11, further comprising determining the dependency based on first information about the first commit, wherein the first information about the first commit includes metadata or a tag indicative of the dependency.

16. A system comprising:
a processing device; and
a memory device on which instructions are stored for causing the processing device to:
receive a first communication via a source control management tool, the first communication indicating that a first commit is to be performed for causing first source code for a project to be merged into a repository associated with the project;
receive a second communication via the source control management tool, the second communication indicating that a second commit is to be performed for causing second source code for the project to be merged into the repository associated with the project;
determine a dependency between the first source code and the second source code in response to receiving the first communication and the second communication; and
in response to determining the dependency between the first source code and the second source code, store the first source code and the second source code in an intermediary repository that is separate from the repository associated with the project;
wherein a build tool is configured to:
monitor the intermediary repository for changes in content;
detect a change in the content of the intermediary repository based on the first source code or the second source code being stored in the intermediary repository;
based on detecting the change in the content of the intermediary repository, obtain the first source code and the second source code from the intermediary repository and integrate the first source code and the second source code together into combined program code; and subsequent to integrating the first source code and the second source code into the combined program code, test the combined program code for defects in the first source code or the second source code at least in part by attempting to build the combined program code.

17. The system of claim 16, wherein the memory device further comprises instructions for causing the processing device to, subsequent to determining the dependency between the first source code and the second source code, store a file in the intermediary repository indicating the dependency between the first source code and the second source code, the file being configured for use by the build tool.

* * * * *